US012732360B2

(12) United States Patent
Recio et al.

(10) Patent No.: US 12,732,360 B2
(45) Date of Patent: Sep. 8, 2026

(54) DISTRIBUTION OF PRIVATE SESSION KEY TO A NETWORK COMMUNICATION DEVICE FOR SECURED RDMA COMMUNICATIONS

(71) Applicant: INTERNATIONAL BUSINESS MACHINES CORPORATION, Armonk, NY (US)

(72) Inventors: Renato J. Recio, Austin, TX (US); Eran Gampel, Tel Aviv (IL); Gal Sagi, Hod Hasharon (IL); Ryan Moats, Omaha, NE (US); Bernard Metzler, Zurich (CH); Ravinder Reddy Amanaganti, San Ramon, CA (US); Etai Lev Ran, Nofit (IL); Dean Har'el Lorenz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 17/883,378

(22) Filed: Aug. 8, 2022

(65) Prior Publication Data

US 2024/0048373 A1 Feb. 8, 2024

(51) Int. Cl.
*H04L 9/08* (2006.01)
*H04L 9/30* (2006.01)
*H04L 67/1097* (2022.01)

(52) U.S. Cl.
CPC ................ *H04L 9/088* (2013.01); *H04L 9/30* (2013.01); *H04L 67/1097* (2013.01)

(58) Field of Classification Search
CPC ........ H04L 9/088; H04L 9/30; H04L 67/1097

(Continued)

(56) References Cited

U.S. PATENT DOCUMENTS 7,036,010 B2 4/2006 Wray
7,437,550 B2 * 10/2008 Savage ................ G06Q 20/383 713/156

(Continued)

FOREIGN PATENT DOCUMENTS

CN 103227742 A 7/2013
CN 108293058 A 7/2018

(Continued)

OTHER PUBLICATIONS

WIPO Appln. No. PCTCN2023107105, International Search Report and Written Opinion, Sep. 2, 20231, 8 pg.

(Continued)

*Primary Examiner* — Liang Che A Wang
(74) *Attorney, Agent, or Firm* — CHIP LAW GROUP

(57) ABSTRACT

A network communication device can receive a private session key from a data processing system. A first work queue element can be received in a send queue of the network communication device. The first work queue element can indicate outbound session data to be communicated to a client device. Responsive to receiving the first work queue element, the network communication device can generate encrypted outbound session data by encrypting the outbound session data using the private session key. The network communication device can communicate, via remote directory memory access (RDMA) over a secured communication tunnel, the encrypted outbound session data to the client device.

20 Claims, 7 Drawing Sheets

700

Receive, by a network communication device from a data processing system, a private session key.
702

↓

Receive in a send queue of the network communication device, from the data processing system, a first work queue element, the first work queue element indicating outbound session data to be communicated to a client device
704

↓

Responsive to receiving the first work queue element, generate, by the network communication device, encrypted outbound session data by encrypting the outbound session data using the private session key
706

↓

Communicate, by the network communication device, via remote directory memory access (RDMA) over a secured communication tunnel, the encrypted outbound session data to the client device
708

(58) Field of Classification Search
USPC .................................. 713/171; 709/223, 229
See application file for complete search history.

(56) References Cited

U.S. PATENT DOCUMENTS 7,631,182 B1 12/2009 Droux et al.
8,019,868 B2 9/2011 Rao
9,231,923 B1 1/2016 Cignetti
9,608,962 B1 3/2017 Chang
10,177,909 B1 1/2019 Sullivan et al.
10,432,590 B2 10/2019 Skuratovich et al.
10,432,591 B2 10/2019 Skuratovich et al.
10,469,461 B1 11/2019 Singh
10,581,819 B1 3/2020 Lototskiy
10,721,059 B2 * 7/2020 Choi .................... H04L 9/0631
10,785,198 B2 9/2020 Pahl et al.
10,909,250 B2 2/2021 Rudzitis et al.
11,082,411 B2 * 8/2021 Li .................... G06F 15/17331
11,240,007 B1 2/2022 Higgins
11,343,247 B1 5/2022 Ozarkar
11,368,298 B2 6/2022 Mestery et al.
11,765,142 B1 9/2023 Recio et al.
11,916,890 B1 2/2024 Recio et al.
11,924,179 B2 3/2024 Recio et al.
12,063,207 B2 8/2024 Nawaz
12,200,118 B1 * 1/2025 Copparapu ............. H04L 9/083
2003/0105725 A1 * 6/2003 Hoffman ................ G06Q 20/40 705/50
2006/0013397 A1 * 1/2006 Dorsch ............... H04L 63/0428 380/256
2007/0110054 A1 5/2007 Kozakai
2008/0040775 A1 2/2008 Hoff
2008/0147555 A1 6/2008 Cromer
2010/0146582 A1 6/2010 Jaber
2010/0325418 A1 12/2010 Kanekar
2011/0153793 A1 6/2011 Tan
2011/0153985 A1 6/2011 Saha
2011/0314284 A1 12/2011 Chou
2012/0078994 A1 3/2012 Jackowski
2012/0177202 A1 7/2012 Dayka
2012/0278878 A1 11/2012 Barkie
2013/0179685 A1 7/2013 Weinstein
2013/0268643 A1 10/2013 Chang
2014/0208123 A1 7/2014 Roth
2014/0226661 A1 8/2014 Mekkattuparamban
2014/0280948 A1 9/2014 Schmidt
2015/0121076 A1 4/2015 Wante
2016/0088029 A1 3/2016 Grndal et al.
2016/0099917 A1 4/2016 Glazemakers
2016/0173488 A1 6/2016 Xie
2017/0006034 A1 1/2017 Link, II
2017/0013015 A1 1/2017 Dinha
2017/0033930 A1 2/2017 Costa
2017/0034129 A1 2/2017 Sawant
2017/0063808 A1 3/2017 Manapragada
2017/0085372 A1 3/2017 Anderson
2017/0093820 A1 3/2017 Forguson
2017/0118180 A1 4/2017 Takahashi
2017/0279607 A1 * 9/2017 Kent .................... H04W 12/37
2017/0279784 A1 * 9/2017 Kent .................... H04L 9/3265
2017/0373828 A1 12/2017 Michiels
2018/0034791 A1 2/2018 Erez
2018/0041613 A1 2/2018 Lapidous
2018/0062835 A1 3/2018 Hamel
2018/0091483 A1 3/2018 Eiriksson et al.
2018/0165224 A1 6/2018 Brown
2018/0234401 A1 8/2018 Cates
2018/0367525 A1 12/2018 Kassimis et al.
2019/0014145 A1 1/2019 Levine
2019/0132120 A1 * 5/2019 Zhang ................ H04L 63/0428
2019/0141041 A1 * 5/2019 Bhabbur .............. H04L 9/3228
2019/0190887 A1 6/2019 Yan
2019/0199835 A1 6/2019 Deval
2019/0372936 A1 12/2019 Sullenberger
2020/0053124 A1 2/2020 Manasse et al.
2020/0067891 A1 2/2020 Singh et al.
2020/0099671 A1 3/2020 Shaw
2020/0127981 A1 4/2020 Yang
2020/0220713 A1 7/2020 Li
2020/0236140 A1 7/2020 Srinivasan
2020/0403919 A1 12/2020 Cui
2021/0099286 A1 4/2021 Xiao
2021/0127269 A1 4/2021 Gupta
2021/0176217 A1 6/2021 Liu
2021/0185025 A1 6/2021 Wang
2021/0226935 A1 7/2021 Mundt
2021/0250174 A1 8/2021 Cheng et al.
2021/0392080 A1 12/2021 Shen
2022/0053326 A1 2/2022 Geng et al.
2022/0070676 A1 * 3/2022 De Graaff .............. H04L 9/088
2022/0103530 A1 3/2022 Daly et al.
2022/0173886 A1 6/2022 Sardesai
2022/0224529 A1 7/2022 Mestery et al.
2022/0247696 A1 8/2022 He et al.
2022/0263811 A1 8/2022 Kampati et al.
2022/0394014 A1 12/2022 Wang
2023/0007709 A1 1/2023 Paladugu et al.
2023/0058273 A1 2/2023 Sundar
2023/0103518 A1 4/2023 Rogers et al.
2023/0297406 A1 9/2023 Rogers et al.
2024/0048536 A1 2/2024 Recio et al.
2024/0048537 A1 2/2024 Recio et al.
2024/0048538 A1 2/2024 Recio et al.
2024/0048541 A1 2/2024 Recio et al.

FOREIGN PATENT DOCUMENTS

CN 113826353 A 12/2021
CN 114788225 A 7/2022
DE 112023003385 T5 5/2025
GB 2637621 A 7/2025
WO 2021138511 A1 7/2021
WO 2024/032312 A1 2/2024
WO 2024/032313 A1 2/2024

OTHER PUBLICATIONS

WIPO Appln. No. PCTCN2023107214, International Search Report and Written Opinion, Sep. 20, 2023, 7 pg.

Lescisin, M. et al., "SocialSDN: Design and Implementation of a Secure Internet Protocol Tunnel Between Social Connections," In 2021 IEEE Int'l. Systems Conf. (SysCon), Dec. 31, 2021, 8 pg.

Cui, T.et al., "Offloading Load Balancers onto SmartNICs," In Proceedings of the 12th ACM SIGOPS Asia-Pacific Workshop on Systems, Aug. 24, 2021, pp. 56-62.

Kim, D. et al., "A Case for SmartNIC-accelerated Private Communication," 4th Asia-Pacific Workshop on Networking, Aug. 3, 2020, pp. 30-35.

Kumari, A.K. et al., "A Symmetric Two-Server Password based Authentication and Key Exchange Protocol Deployed in PaaS," International Journal of Computer Applications, International Conference on Innovations in Computing Techniques, ICICT 2015, vol. 975, p. 8887 (7 pg).

Tork, M. et al., "Lynx: A SmartNIC-driven Accelerator-centric Architecture for Network Servers," In Proceedings of the Twenty-Fifth International Conference on Architectural Support for Programming Languages and Operating Systems, Mar. 9, 2020, pp. 117-131.

Pfister, G.F., "An introduction to the infiniband architecture," High Performance Mass Storage and Parallel I/O, Chap. 42, Jun. 2001, pp. 617-632.

"Getting Started with IBM Cloud Hyper Protect Crypto Services," [online] IBM Cloud Docs, Hyper Protect Crypto Services, Last modified Jun. 28, 2022 [retrieved Aug. 8, 2022], retrieved from the Internet: <https://cloud.ibm.com/docs/hs-crypto?topic=hs-crypto-get-started>, 11 pg.

Taranov, K. et al., "sRDMA—Efficient {NIC-based} Authentication and Encryption for Remote Direct Memory Access," In 2020 USENIX Annual Technical Conference (USENIX ATC 20), Jul. 15-17, 2020, pp. 691-704.

(56) References Cited

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.
Recio, R.J. et al., "RFC 5040: A remote direct memory access protocol specification," [online] Standards Track, Tech-invite, Oct. 2007, retrieved from the Internet: <https://www.rfc-editor.org/rfc/rfc5040>, 22 pg.
"TCP offload engine," [online] from Wikipedia, the free encyclopedia, Jun. 6, 2022, retrieved from the Internet: <https://en.wikipedia.org/wiki/TCP_offload_engine>, 7 pg.
IBM: List of IBM Patents or Patent Applications Treated as Related, Aug. 9, 2022, 2 pg.
Recio, R.J. et al., "API Based Distribution of Private Session Key to Network Communication Device for Secured Communications", U.S. Appl. No. 17/883,349, filed Aug. 8, 2022, 42 pages (A copy is not provided as this application is available to the Examiner.).
Recio, R.J. et al., "Based Distribution of Private Session Key to Network Communication Device for Secured Communicationss", U.S. Appl. No. 17/883,328, filed Aug. 8, 2022, 42 pages (A copy is not provided as this application is available to the Examiner.).
Recio, R.J. et al., "Distribution of a Cryptographic Service Provided Private Session Key to Network Communication Device for Secured Communications", U.S. Appl. No. 17/883,425, filed Aug. 8, 2022, 46 pages (A copy is not provided as this application is available to the Examiner.).
Recio, R.J. et al., "Distribution of Private Session Key and Offloading a Protocol Stack to a Network Communication Device for Secured Communications", U.S. Appl. No. 17/883,449, filed Aug. 8, 2022, 42 pages (A copy is not provided as this application is available to the Examiner.).

* cited by examiner

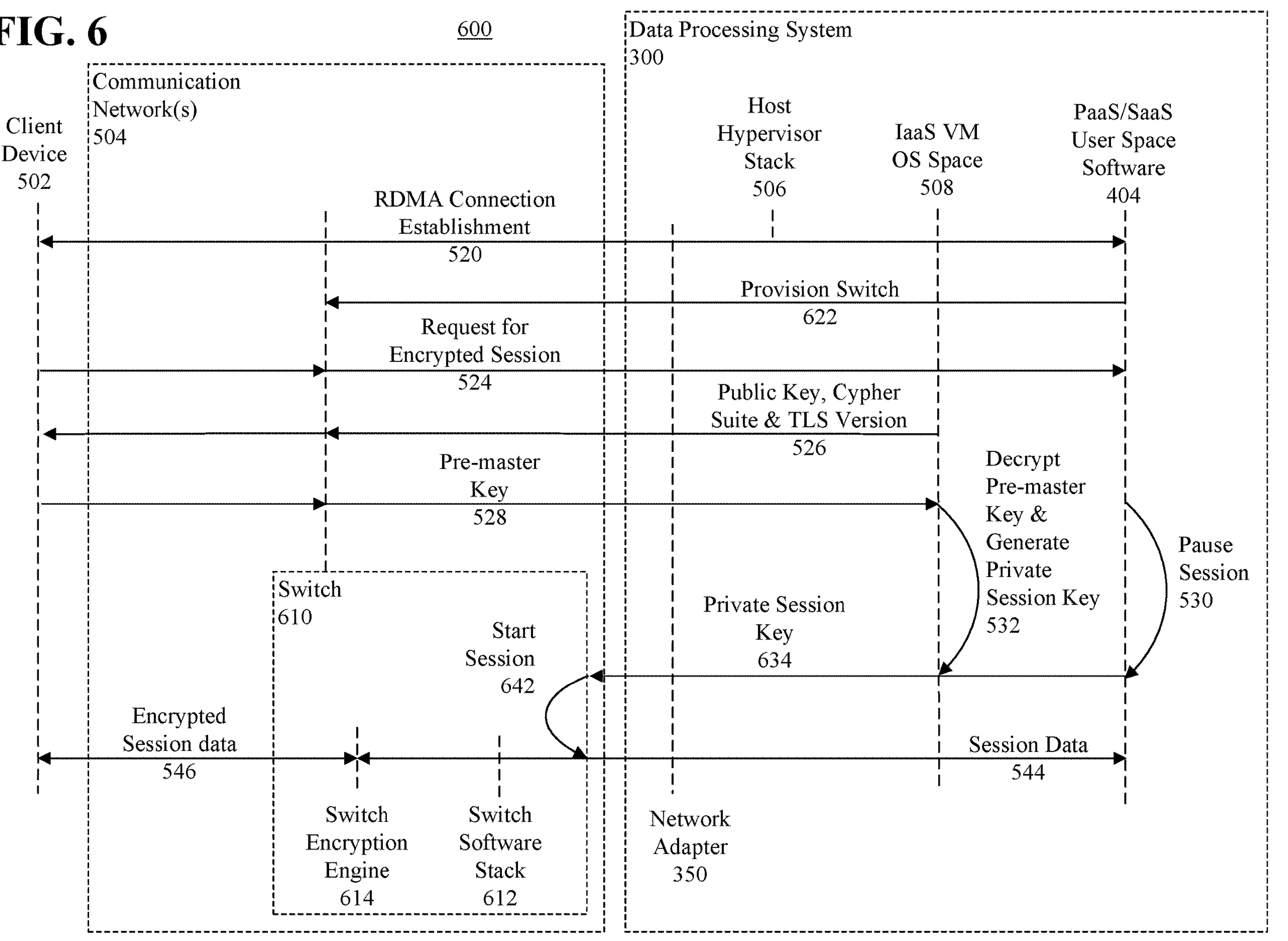
FIG. 6
600
Communication
Network(s)
504
Client
Device
502
Data Processing System
300
Host
Hypervisor
Stack
506
IaaS VM
OS Space
508
PaaS/SaaS
User Space
Software
404
RDMA Connection
Establishment
520
Provision Switch
622
Request for
Encrypted Session
524
Public Key, Cypher
Suite & TLS Version
526
Pre-master
Key
528
Decrypt
Pre-master
Key &
Generate
Private
Session Key
532
Pause
Session
530
Switch
610
Start
Session
642
Private Session
Key
634
Encrypted
Session data
546
Session Data
544
Switch
Encryption
Engine
614
Switch
Software
Stack
612
Network
Adapter
350

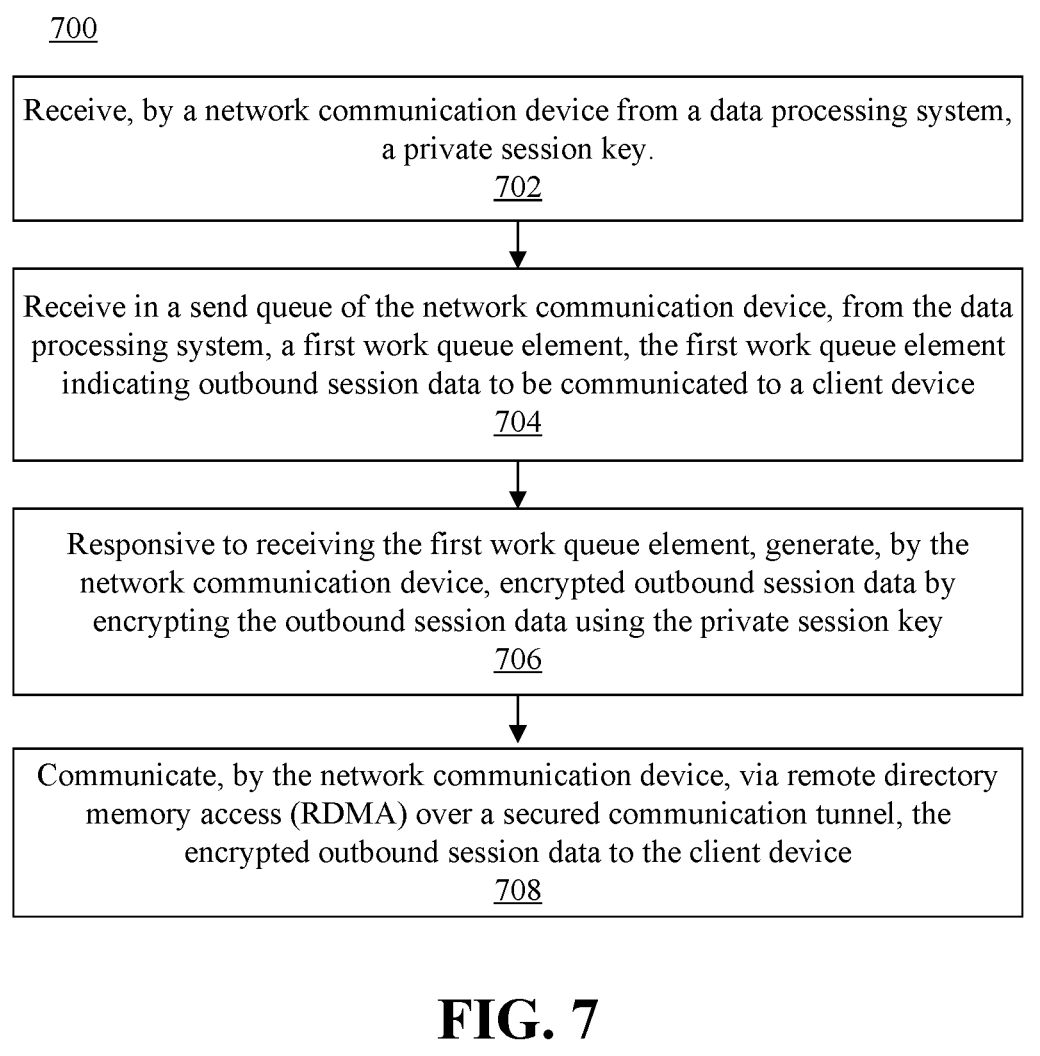

700

Receive, by a network communication device from a data processing system, a private session key.
702

Receive in a send queue of the network communication device, from the data processing system, a first work queue element, the first work queue element indicating outbound session data to be communicated to a client device
704

Responsive to receiving the first work queue element, generate, by the network communication device, encrypted outbound session data by encrypting the outbound session data using the private session key
706

Communicate, by the network communication device, via remote directory memory access (RDMA) over a secured communication tunnel, the encrypted outbound session data to the client device
708

FIG. 7

DISTRIBUTION OF PRIVATE SESSION KEY TO A NETWORK COMMUNICATION DEVICE FOR SECURED RDMA COMMUNICATIONS

BACKGROUND

The present invention relates to data encryption, and more specifically, to communication session data encryption.

Data encryption is used to secure data by encoding the data so that the data is incomprehensible until it the data decoded. Data encryption oftentimes is applied to data being communicated over the Internet. Internet Key Exchange (IKE) is a security protocol commonly implemented for secure Internet communications. IKE uses a session key to encrypt and decrypt data. A session key is a single-use symmetric cryptographic key used for encrypting/decrypting messages in a communication session. In this regard, a session key is a temporary key typically only used for a particular communication session. Other communication sessions will have their own session keys.

SUMMARY

A method includes receiving, by a network communication device from a data processing system, a private session key. The method also can include receiving in a send queue of the network communication device, from the data processing system, a first work queue element, the first work queue element indicating outbound session data to be communicated to a client device. The method also can include, responsive to receiving the first work queue element, generating, by the network communication device, encrypted outbound session data by encrypting the outbound session data using the private session key. The method also can include communicating, by the network communication device, via remote directory memory access (RDMA) over a secured communication tunnel, the encrypted outbound session data to the client device.

A system includes a processor programmed to initiate executable operations. The executable operations include receiving, by a network communication device from a data processing system, a private session key. The executable operations also can include receiving in a send queue of the network communication device, from the data processing system, a first work queue element, the first work queue element indicating outbound session data to be communicated to a client device. The executable operations also can include, responsive to receiving the first work queue element, generating, by the network communication device, encrypted outbound session data by encrypting the outbound session data using the private session key. The executable operations also can include communicating, by the network communication device, via remote directory memory access (RDMA) over a secured communication tunnel, the encrypted outbound session data to the client device.

A computer program product includes a computer readable storage medium having program code stored thereon. The program code is executable by a data processing system to initiate operations. The operations include receiving, by a network communication device from a data processing system, a private session key. The operations also can include receiving in a send queue of the network communication device, from the data processing system, a first work queue element, the first work queue element indicating outbound session data to be communicated to a client device. The operations also can include, responsive to receiving the first work queue element, generating, by the network communication device, encrypted outbound session data by encrypting the outbound session data using the private session key. The operations also can include communicating, by the network communication device, via remote directory memory access (RDMA) over a secured communication tunnel, the encrypted outbound session data to the client device.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 6 depicts a flow diagram illustrating another example of performing RDMA based communication session encryption initialization.

FIG. 7 depicts a flowchart illustrating a method of performing RDMA based communication session encryption initialization.

DETAILED DESCRIPTION

Figure 1:
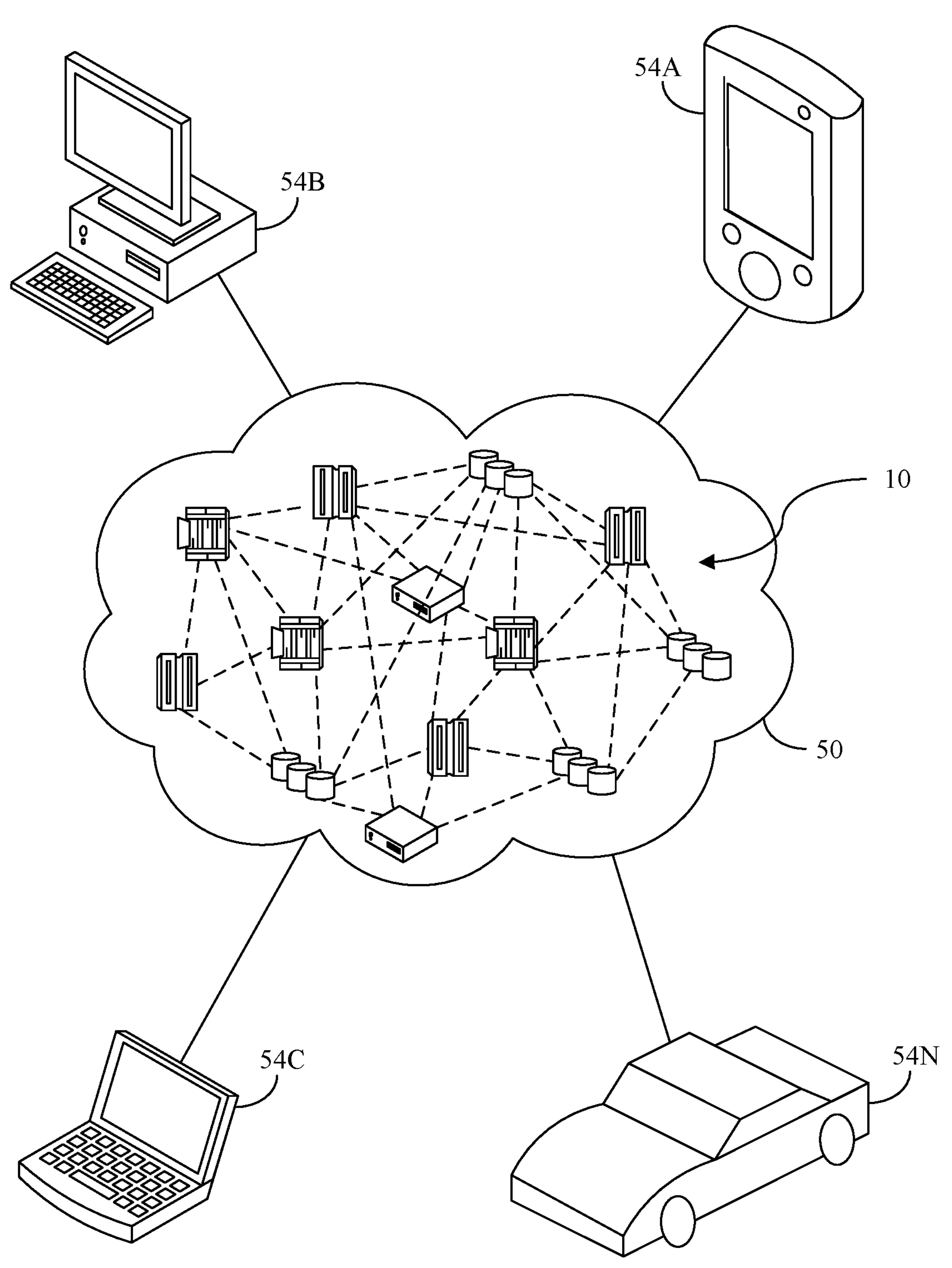
FIG. 1 depicts a cloud computing environment according to an embodiment of the present invention.

This disclosure relates to data encryption, and more specifically, to communication session data encryption.

The arrangements described herein are directed to computer technology, and provide an improvement to computer technology. Specifically, the present arrangements improve communication session data security, while reducing the use of resources to implement data security at the management and virtualization functional abstraction layers provided by cloud computing environments.

In accordance with the arrangements described herein, a private session key for a secure data communication session can be generated in user space of a host data processing system. The private session key then can be stored on a network communication device (e.g., a network adapter or a switch), and the network communication device can implement data encryption and decryption for the communication session, and communicate encrypted data via remote directory memory access (RDMA). Accordingly, the host hypervisor stack and virtual machine operating system space need not store the private session key, and need not allocate valuable data processing resources to implement data encryption/decryption for the communication session. This serves to free up processor and memory resources on the host data processing system, which otherwise would be used for performing data encryption/decryption for the communication session, to be used for other tasks. Moreover, by virtue of the private session key being stored on the network communication device rather than in the host hypervisor stack or in the virtual Machine operating system space, the risk of the private session key being discovered by an unscrupulous party gaining unauthorized access to the host data processing system is mitigated.

Several definitions that apply throughout this document now will be presented.

As defined herein, the term "user space" means data processing system memory (e.g., local memory and/or cache memory) segregated from kernel space and allocated to running applications hosted for access by client devices. User space can be, for example, a portion of virtual memory segregated from virtual memory allocated as kernel space.

As defined herein, the term "kernel space" means data processing system memory (e.g., local memory and/or cache memory) allocated to running kernel applications, and also may include data processing system memory allocated to running hypervisor applications.

As defined herein, the term "public key" means a cryptographic key sent from a first system or device to a second system or device and used for secure data communications, wherein encrypted messages only can be deciphered by the second system or device by use of the public key, for example by using the public key to generate a private session key used to decrypt the encrypted messages.

As defined herein, the term "private session key" means a cryptographic key only known to a particular system or device and used by that system or device to decrypt encrypted messages communicated to that system or device.

As defined herein, the term "session packet" means is a unit of data made into a single package that travels along a network path.

As defined herein, the term "encrypted session packet" means a session packet that is encrypted using a cryptographic key, for example using a private session key.

As defined herein, the term "secure communication tunnel" means an encrypted communication link between a first system or device and a second system or device.

As defined herein, the term "n-tuple" means a finite ordered list of elements, where n is a non-negative integer.

As defined herein, the term "verb" means a descriptor providing a semantic description of functionality of a network communication device to perform a remote direct memory access (RDMA) operation without involving a processor of a data processing system to execute the command.

As defined herein, the term "network communication device" means a network adapter or a switch.

As defined herein, the term "network adapter" means a hardware device that connects a data processing system to a data communications network. Although data processing systems and network infrastructure may include one or more network adapters, data processing systems (e.g., servers and client devices) are not network adapters as the term "network adapter" is defined herein, and network infrastructure (e.g., routers, firewalls, switches, access points and the like) are not network adapters as the term "network adapter" is defined herein.

As defined herein, the term "switch" means a hardware device in network infrastructure that connects devices on a data communications network, using packet switching to receive data and forward data to a destination device.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory. A network adapter, per se, is not a data processing system as the term "data processing system" is defined herein. Network infrastructure, such as routers, firewalls, switches, access points and the like, are not data processing systems as the term "data processing system" is defined herein.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user interacts. Examples of a client device include, but are not limited to, a terminal, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "automatically" means without user intervention.

As defined herein, the term "user" means a person (i.e., a human being).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
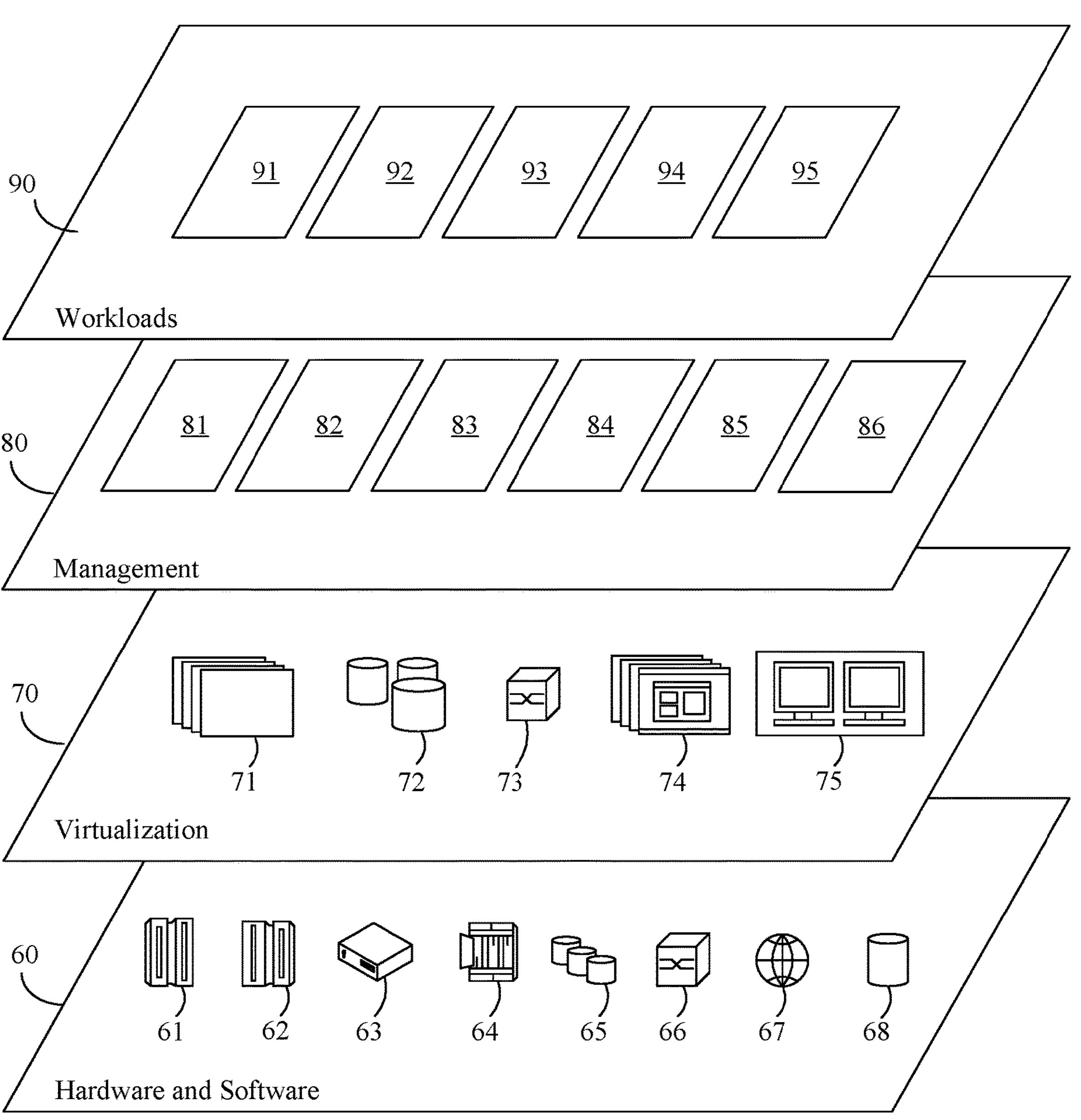
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. The networking components 66 can comprise, for example, network adapters, switches, routers, etc. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. RDMA based communication session encryption initialization 86 can be used to generate private session keys for data communication sessions, and store the private session keys on network adapters in the hardware and software layer 60 for use in RDMA communication. The network adapters can perform data encryption and decryption for communication sessions using the private session keys. Accordingly, computing resources provided by the virtualization layer 70 and management layer 80 are freed from being tasked with performing such encryption and decryption.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Figure 3:
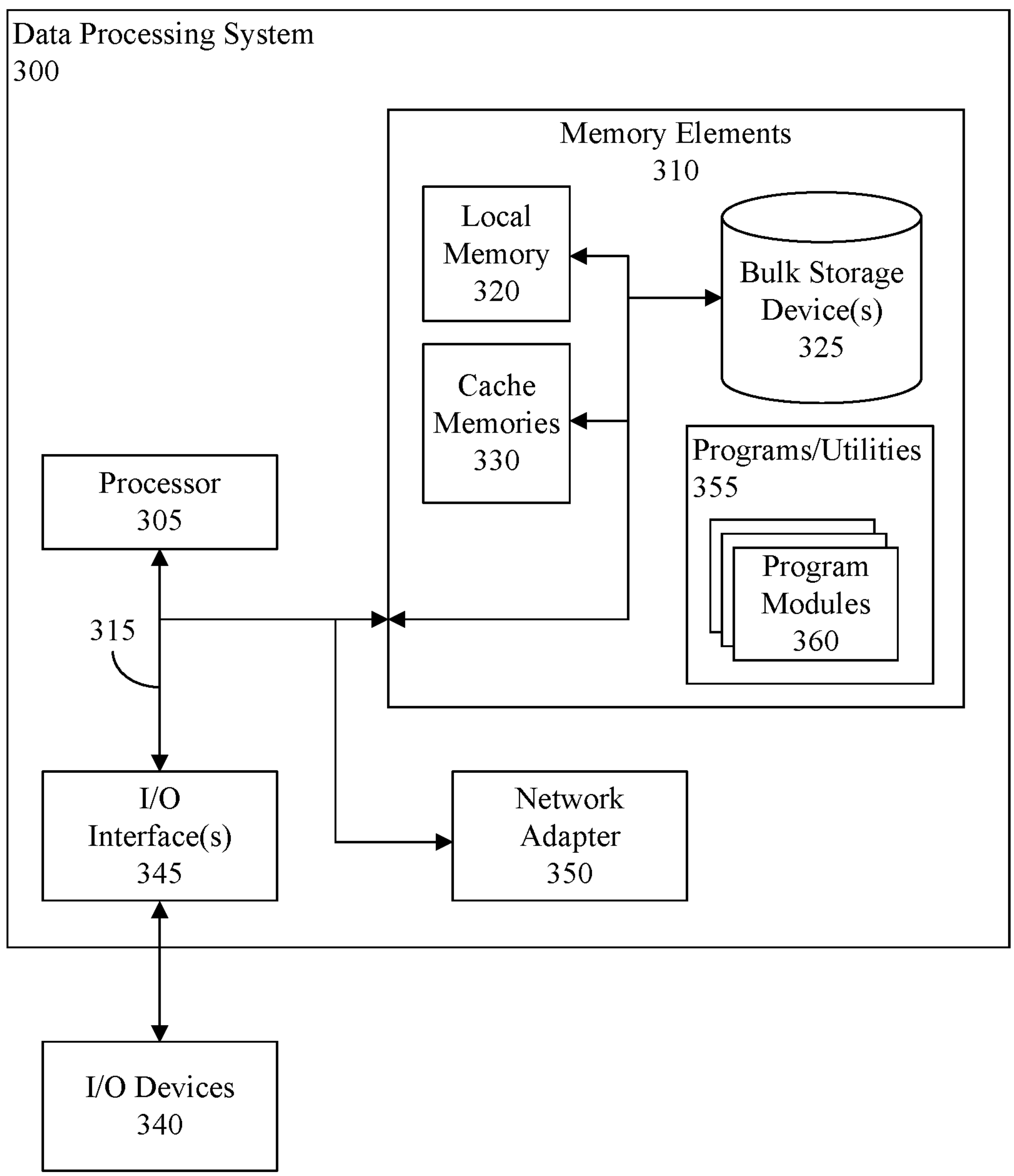
FIG. 3 depicts a block diagram illustrating example architecture for a data processing system.

FIG. 3 depicts a block diagram illustrating example architecture for a data processing system 300, which can be implemented at the hardware and software layer 60 of the cloud computing environment 50. The data processing system 300 can include at least one processor 305 (e.g., a central processing unit) coupled to memory elements 310 through a system bus 315 or other suitable circuitry. As such, the data processing system 300 can store program code within the memory elements 310. The processor 305 can execute the program code accessed from the memory elements 310 via the system bus 315. It should be appreciated that the data processing system 300 can be implemented in the form of any system including a processor and memory that is capable of performing the functions and/or operations described within this specification. For example, the data processing system 300 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The data processing system 300 also can include one or more cache memories (330) that provide temporary storage of at least some program code in order to reduce the number of times program code must be retrieved from the local memory 320 and/or bulk storage device 325 during execution.

Input/output (I/O) devices 340, such as a display, a pointing device, a keyboard, etc. can be coupled to the data processing system 300. The I/O devices 340 can be coupled to the data processing system 300 either directly or through intervening I/O interfaces 345. One or more network adapters 350 also can be coupled to data processing system 300 to enable the data processing system 300 to become coupled to other systems, computer systems, remote printers, and/or remote storage devices through intervening private or public networks. Modems, cable modems, transceivers, and Ethernet cards are examples of different types of network adapters 350 that can be used with the data processing system 300.

As pictured in FIG. 3, the memory elements 310 can store the components of the system, namely one or more programs/utilities 355, each of which may comprise one or more program modules 360. The programs/utilities 355 can include, for example, an application that performs user space communication session encryption initialization 96. Being implemented in the form of executable program code, the programs/utilities 355 can be executed by the data processing system 300 and, as such, can be considered part of the data processing system 300. Moreover, the programs/utilities 355 include functional data structures that impart functionality when employed as part of the data processing system 300. As defined within this disclosure, a "data structure" is a physical implementation of a data model's organization of data within a physical memory. As such, a data structure is formed of specific electrical, magnetic or optical structural elements in a memory. A data structure imposes physical organization on the data stored in the memory as used by an application program executed using a processor.

Figure 4:
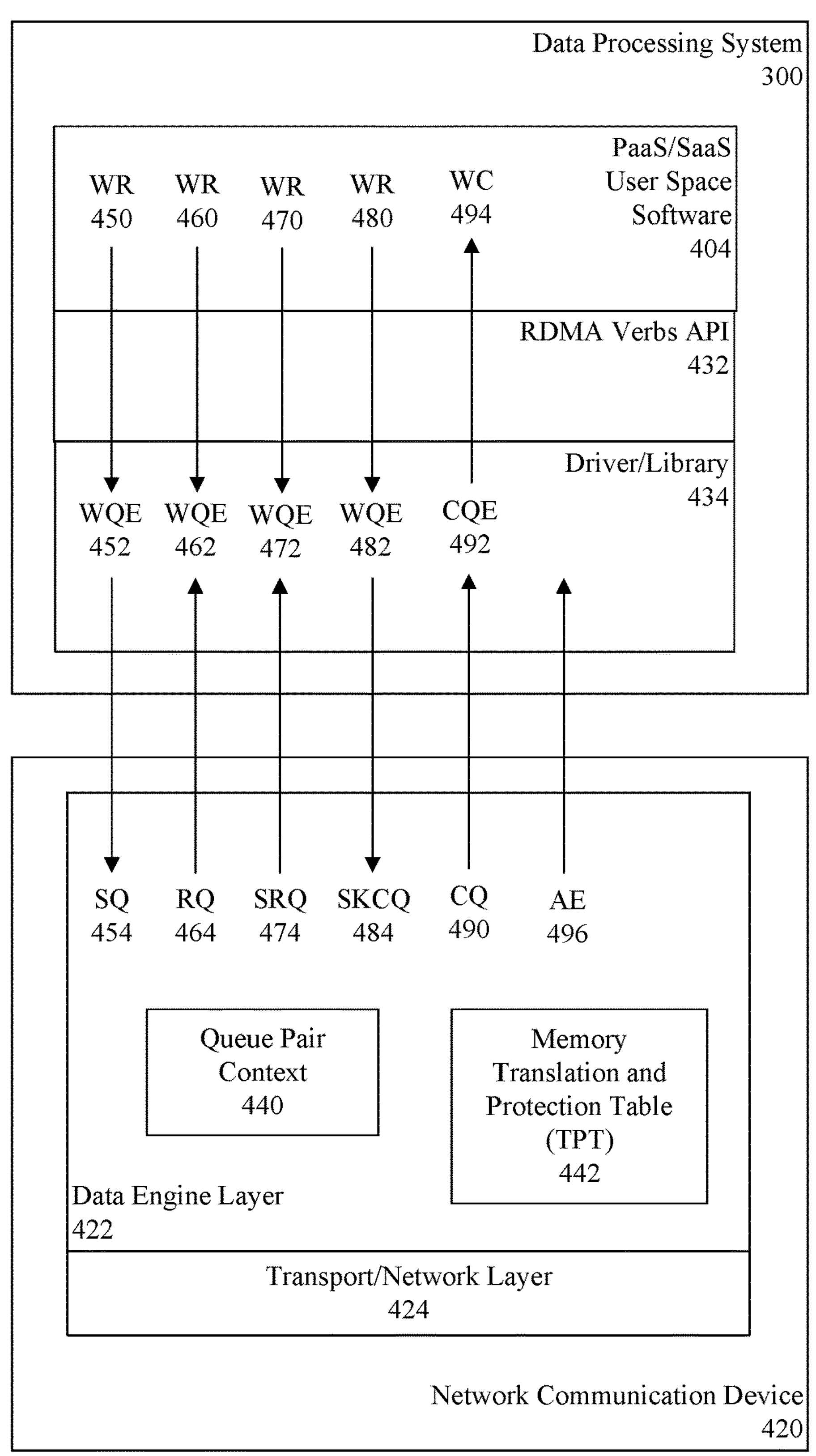
FIG. 4 depicts a block diagram illustrating an example of communication processes using remote directory memory access (RDMA).

FIG. 4 depicts a block diagram 400 illustrating an example of communication processes using remote directory memory access (RDMA). RDMA is direct memory access from the memory of one processing system into the memory of another processing system without involving either processing systems' operating system. RDMA permits high throughput and low latency network communication.

Using RDMA for communication, PaaS and/or SaaS user space software 404 hosted on the data processing system 300 can interact with a network communication device 420 (e.g., a network adapter or a switch) to communicate with other network nodes (e.g., client devices). Implementing RDMA, the network communication device 420 can write data to, and read data from, memory of the other network nodes. The network communication device 420 can include a data engine layer 422 and a transport/network layer 424 configured for RDMA communication.

The PaaS and/or SaaS user space software 404 can communicate using RDMA through the use of verbs 430, which can be exposed by a RDMA Verbs application programming interface (API) 432 using a driver and/or library 434. Examples of verbs include, but need not be limited to, "write," "read," "send" and "recv" (receive). Verbs 430 can be used to manage a connection state, manage memory and queue access, submit work to the network communication device 420, and retrieve work and events from the network communication device 420. For example, send verbs 430 can be submitted to a send a work request 450 to a send queue 454 on the network communication device 420 and receive verbs can be submitted as a work request 460 to a receive queue 464 on the network communication device 420 or a shared receive queue 474 on the network communication device 420. Together the send queue 454 and receive queue 464 are known as a queue pair.

In illustration, the PaaS and/or SaaS user space software 404 can invoke the network communication device 420 to implement RDMA. During that process, the PaaS and/or SaaS user space software 404 can initiate the network communication device 420 to create queue pair context 440 using a specific queue identifier provided by the PaaS and/or SaaS user space software 404. In response, the network communication device 420 can create the queue pair context 440 assigned the specific queue identifier, and exclusively allocate the queue pair context 440 to the PaaS and/or SaaS user space software 404 (e.g., to a particular application). The network communication device 420 can use the queue pair context to process work queue elements to send and receive data.

For instance, the network communication device 420 can include a memory translation and protection table 442 that identifies memory regions (i.e., ranges of memory addresses) of the data processing system 300 from which data is communicated and to which data is communicated. The memory translation and protection table 442 can include data indicating memory addresses. a local memory key used to access local memory addresses, and a remote memory key used to access remote memory addresses. Thus, the memory translation and protection table 442 can register local memory and remote memory with the network communication device 420. Remote nodes (e.g., other data processing systems, which can include one or more client devices) with which the data processing system 300 exchanges session data can be communicatively linked to similarly configured network communication devices. The network communication device 420 can communicate with the other network communication devices to exchange session data (e.g., session packets).

To send outbound session data to another network node (e.g., another data processing system), the PaaS and/or SaaS user space software 404 can generate a work request 450 calling the API 432 to submit a send data unit of work. The work request 450 can include a work request type, a scatter/gather list of memory regions (e.g., memory buffers) of the data processing system 300 containing data to be communicated and other modifiers, for example those defined in the InfiniBand Architecture Specification Volume 1 (IBASV1). Examples of other modifiers include, but are not limited to, a memory region key and an address of a remote data processing system's memory region where data is to be placed. The API 432 can utilize the driver/library 434 to convert the work request 450 (e.g., a verb) to a work queue element 452, and submit the work queue element 452 to a send queue 454 in the data engine layer 422 of the network communication device 420.

The network communication device 420 can process the work queue element 452 to access the outbound session data from the indicated memory regions and communicate the outbound session data to another network communication device managing RDMA for the other network node. The work queue element 452, for example, can be a RDMA Send operation, a RDMA Write operation, or a RDMA Read operation. If the work queue element 452 is a RDMA Send operation, processing of the work queue element 452 can initiate the data to be sent over the network and the other network communication device can store session data in memory regions (e.g., memory buffers) of the other network node to which the session data is being communicated, where those memory regions are referenced by a work queue element (WQE 462) in a receive queue (RQ 464) of the other network communication device. If the work queue element 452 is a RDMA Write operation, processing of the work queue element 452 can initiate the data is sent over the network and the other communication device can store session data in memory regions referenced by the IBASV1 defined Remote Key, Virtual Address and length in the message. If the work queue element 452 is a RDMA Read operation, processing of the work queue element 452 can initiate the data to be retrieved over the network from the other communication device's memory region that is referenced by the IBASV1 defined Remote Key, Virtual Address and length in the message.

The network communication device 420 can receive inbound RDMA Write session data, generated by another network node, from another network communication device and store the inbound session data to memory regions (e.g., a memory buffer) of the data processing system 300. The PaaS and/or SaaS user space software 404 can access the data stored in the memory region through the local memory key and virtual address it used to create the memory region in the memory translation and protection table 442. Similarly, the network communication device 420 can receive inbound Send session data, generated by another network node, from another network communication device and store the inbound session data to memory regions (e.g., a memory buffer) of the data processing system 300. The PaaS and/or SaaS user space software 404 can retrieve the data through a receive queue 464 work queue element 462, which has data segments pointing to one or more memory regions stored through the memory translation and protection table 442.

To retrieve the inbound session data received through a Send, the PaaS and/or SaaS user space software 404 may have previously generated a work request 460 calling the API 432 to submit a receive data unit of work. The work request 460 can include a work request type and other modifiers. The API 432 can utilize the driver/library 434 to convert the work request 460 (e.g., a verb) to a work queue element 462, and submit the work queue element 462 to the data engine layer 422 of the network communication device 420. The network communication device 420 can process the work queue element 462 through a queue pair context 440 corresponding to the work queue element 462 to identify queue elements in the receive queue 464 or the shared receive queue 474. The network communication device 420 can communicate those queue elements to the API 432. The API 432 can process the queue elements to identify corresponding entries in the memory translation and protection table 442, and use those entries to identify the memory regions where the session data is stored. Using each local memory key and virtual address stored in the data segment, the API 432 can access the session data from each memory region and communicate the session data to the PaaS/SaaS user space software 404.

In an alternative mode of retrieving data, the PaaS and/or SaaS user space software 404 can generate a work request 470 calling the API 432 to retrieve data units of work across multiple shared receive queues 474 associated with multiple network connections. The API 432 can utilize the driver/library 434 to convert the work request 470 (e.g., a verb) to a work queue element 472, and submit the work queue element 472 to the shared receive queue 474 in the data engine layer 422 of the network communication device 420. The network communication device 420 can process the work queue element 472 through the queue pair context 440 corresponding to the work queue element 472, for example as previously described for the work queue element 462, but for session data received from a plurality of network nodes.

Responsive to determining that a private session key, which will be discussed herein, is to be changed, or responsive to a communication session being terminated, the PaaS and/or SaaS user space software 404 can generate a work request 480 to initiate the network communication device 420 to delete a current private session key being used for the communication session. The API 432 can utilize the driver/library 434 to convert that work request 480 (e.g., a verb) to a work queue element 482, and submit the work queue element 482 to a session key control queue 484 in the data engine layer 422. Responsive to the work queue element 482 being added to the session key control queue 484, the network communication device 420 can delete, or otherwise destroy, the current private session key and replace it with the session key passed in through the work queue element 482.

In response to processing a work queue element 452, 462, 472, 482, the network communication device 420 can input into a completion queue a completion queue element 492 indicating the work for the work queue element 452, 462, 472, 482 is complete. For example, responsive to completing the work queue element 452 from the send queue 454, the network communication device 420 can enter into the completion queue 490 a completion queue element 492 indicating such. Responsive to completing the work queue element 462 from the receive queue 464, the network communication device 420 can enter into the completion queue 490 a completion queue element 492 indicating such. Responsive completing the work queue element 472 from the shared receive queue 474, the network communication device 420 can enter into the completion queue 490 a completion queue element 492 indicating such. Responsive completing the work queue element 482 from the session key control queue 484, the network communication device 420 can enter into the completion queue 490 a completion queue element 492 indicating such. The API 432 can poll the completion queue 490 for completion queue elements 492 and utilize the driver/library 434 to convert the completion queue elements 492 work complete (WC) indicators 494 that indicate to the PaaS and/or SaaS user space software 404 that the corresponding work requests 450, 460, 470, 480 are complete.

The network communication device 420 also can generate asynchronous event data 496 indicating asynchronous events that occurred on the queue pair, and communicate the asynchronous event data 496 to the API 432. Examples of asynchronous event data 496 are memory access failures due to an invalid memory access key, or the draining of the send queue associated with the queue pair.

Figure 5:
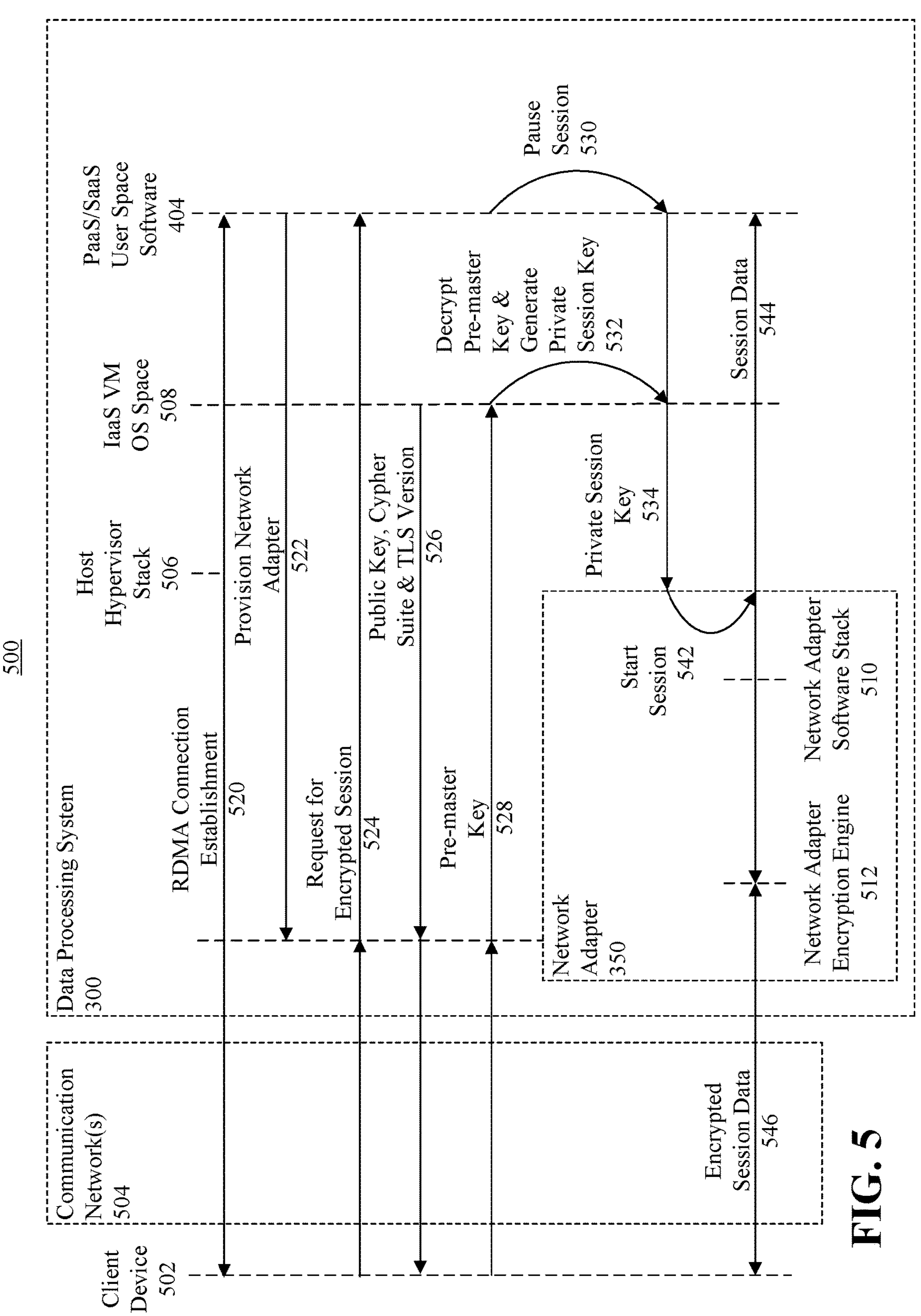
FIG. 5 depicts a flow diagram illustrating an example of performing RDMA based communication session encryption initialization.

FIG. 5 depicts a flow diagram 500 illustrating an example of performing RDMA based communication session encryption initialization 86. The RDMA based communication session encryption initialization 86 can be implemented by the data processing system 300 of FIG. 3. The data processing system 300 can be configured to provide PaaS and/or SaaS user space software to client devices, including a client device 502. In this regard, the data processing system 300 can allocate a portion of the memory elements 310 for user space, for example to store PaaS and/or SaaS user space software 404. The PaaS and/or SaaS user space software 404 can be assigned to virtual machine (VM) hosted by the data processing system 300, but stored and executed in user space memory separate from memory assigned to a host hypervisor stack 506, memory assigned to an Infrastructure as a Service (IaaS) VM operating system space 508, and memory assigned to the operating system space (e.g., kernel space) of the data processing system 300. The PaaS and/or SaaS user space software 404 can be managed, for example, using a container.

As noted, the data processing system 300 can include a network adapter 350 (FIG. 3), which can communicatively link the data processing system 300 to a client device 502 via one or more communication networks 504. The network adapter 350 can be a smart network adapter, and can include a network adapter software stack 510. In illustration, the network adapter 350 can be a smart network interface card (SmartNIC) that supports Software-Defined Networking (SDN). A SmartNIC is a network adapter that offloads processing tasks the processor 305 of the data processing system 300 normally would handle, such as performing encryption/decryption, performing firewall operations, and implementing communication processing. The communication processing can include RDMA communication processing, RDMA over Converged Ethernet (RoCE) communication processing, InfiniBand over Ethernet (IBoE) communication processing, transmission Control Protocol/Internet Protocol (TCP/IP) communication processing, Hypertext Transfer Protocol (HTTP) communication processing, transport layer security protocol (TLS) communication processing, Datagram Transport Layer Security protocol (DTLS) communication processing and/or Quick UDP Internet Connection protocol (QUIC) communication processing. A network adapter 350 can be internal to the data processing system 300, or external to the data processing system 300 and communicatively linked to the data processing system 300 via a suitable I/O device 340. A network adapter 350 can be internal to the data processing system 300, or external to the data processing system 300 and communicatively linked to the data processing system 300 via a suitable I/O device 340.

The network adapter 350 also can include an encryption engine 512 configured to encrypt and decrypt data packets, as will be described. The network adapter 350 also can include a communication interface (not shown), for example a PCI Express interface or other suitable interface, configured to communicate with the data processing system 300. The network adapter 350 also can include a communication interface (not shown) configured to communicate via one or more communication networks. By way of example, the network adapter 350 can include an Ethernet port or a wireless communication (e.g., WiFi) port.

In operation, the data processing system 300 can execute a program/utility 355 (FIG. 3) hosted in the PaaS and/or SaaS user space software 404, and that initiates RDMA connection establishment 520 for a communication session. For example, the program/utility 355 can listen for connection requests, including a connection request from the client device 502. In response to receiving a connection request from the client device 502, at step 522 the program/utility 355, using the API 432 or another API, can provision, in real time, the network adapter 350 for RDMA communications with the client device 502. In illustration, the provisioning can include the program/utility 355 creating a queue pair, which includes a send queue 454 and a receive queue 464, in the data engine layer 422 of the network adapter 350. The provisioning also can include the program/utility 355 creating a completion queue 490 in the data engine layer 422 of the network adapter 350. The provisioning further can include the program/utility 355 registering a memory region of the data processing system 300 with the network adapter 350. For example, the program/utility 355 can update the memory translation and protection table 442 in the network adapter 350 to indicate memory regions of the data processing system 300 from which data is to be accessed or copied, and to which data is communicated.

Thereafter, the data processing system 300 can communicate with the client device 502 via RDMA.

The program/utility 355 can communicate to the client device 502, via RDMA, data indicating that the program/utility 355 is ready to receive a request for an encrypted communication session. In response, the client device 502 can communicate, in real time, to the PaaS and/or SaaS user space software 404 a request 524 for an encrypted session. The request can indicate cypher suites available for encryption by the client device 502, TLS versions used by the client device 502 and a string of random bytes known as "client random" data. In response to the request 524, the program/utility 355 can perform a public key exchange with the client device 502. In illustration, the program/utility 250 can generate, in real time, a public key, select a cypher suite from among the cypher suites indicated by the client device 502, and select a TLS version from among the TLS versions indicated by the client device 502.

At step 526, the program/utility 250 can communicate, in real time, to the client device 502 the public key and indications of the selected cypher suite and TLS version. For example, the PaaS/SaaS User Space Software 404 can communicate to the client device 502 the public key, indications of the selected cypher suite and TLS version, and a "server random," which can be another random string of bytes that's generated by the server. The network adapter 350 can communicate the public key, indications of the selected cypher suite and TLS version, and the "server random" to the client device 502 in accordance with the process described in FIG. 4 for sending outbound session data.

In response to receiving the public key and indications of the selected cypher suite and TLS version, the client device 502 can verify a server certificate for the data processing system 300 and extract the public key. The client device 502 can use the public key to encrypt, in real time, a new pre-master key 528, and communicate, in real time, the pre-master key 528 to the data processing system 300. For example, the client device 502 and its network adapter 350 can send the pre-master key 528 in accordance with the process described in FIG. 4 for sending outbound session data. The network adapter 350 can receive the pre-master key 528 and store the pre-master key to one or more regions of memory of the data processing system 300, and the PaaS/SaaS User Space Software 404 can access the pre-master key 528 from the memory region(s) in accordance with the process described in FIG. 4 for receiving inbound session data. At step 532, the PaaS/SaaS User Space Software 404 can generate a private session key from the client random, the server random, and the premaster secret previously exchanged. At step 534 the PaaS/SaaS User Space Software 404 can communicate the private session key to the network adapter 350 via a work request 480, which can be submitted as a work queue element 482 on the private session key control queue 484. The network adapter 350 can setup the private session key for use on encryption and decryption of messages associated with the queue pair context 440. The PaaS/SaaS User Space Software 404 can communicate to the client device 502 a "finished" message encrypted with the session key. Communication then can begin using the private session key. In this regard, in response to completion of the private session key exchange, at step 542 the network adapter 350 can start, in real time, the communication session with the client device 502, including exchange of session data 544.

Communication of session data 544 between the PaaS/SaaS user space software 404 and the client device 502 can take place in accordance with the processes described with respect to FIG. 4, except with the addition of the network adapter 350 using the private session key to encrypt and decrypt the session data.

In illustration, for outbound session data 544, the PaaS and/or SaaS user space software 404 can generate work requests 450 indicating session data 544 to be communicated to the client device 502. As noted, the work requests 450 can include a work request type, a scatter/gather list of memory regions (e.g., local memory buffers) in the data processing system 300 containing the session data 544 to be communicated, and other modifiers. The API 432 can utilize the driver/library 434 to convert the work requests 450 (e.g., verbs) to work queue elements 452, and submit the work queue elements 452 to the send queue 454, established for the communication session in the data engine layer 422 of the network adapter 350, as queue elements of the send queue 454.

The network adapter 350 can process the work queue elements 452 to access the outbound session data 544 from the indicated memory regions, and generate encrypted outbound session data 546 by encrypting the outbound session data 544 using the private session key to establish a secured communication tunnel (secure RDMA tunnel) over which RDMA communications take place. The network adapter 350 can communicate the encrypted outbound session data 546, over the secure RDMA tunnel, to another network communication device managing RDMA for the client device 502. The other network communication device can decrypt the encrypted outbound session data 546 to retrieve the session data 544 using its private session key, and store the session data 544 in memory regions (e.g., memory buffers) of the client device 502. The other network communication device can create a queue element in a receive queue of the other network communication device. The other network communication device also can update a memory translation and protection table of the other network communication device to indicate where the session data is stored. The client device 502 can access the session data using the processes described herein for receiving session data.

The network adapter 350 can receive inbound encrypted session data 546, generated by the client device 502, from the other network communication device used by the client device 502, and generate inbound session data 544 by decrypting the inbound encrypted session data 546. The network adapter 350 can store the inbound session data 544 to memory regions (e.g., a memory buffer) of the data processing system 300. The network adapter 350 can update the memory translation and protection table 442 with data (e.g., one or more data table entries) indicating the memory regions where the inbound session data 544 is stored and a memory key to access those memory regions. Further, the network adapter 350 can generate a queue element in the receive queue 464. That queue element can indicate data (e.g., data table entries) generated for the inbound session data 544.

To retrieve the inbound session data 544, the PaaS and/or SaaS user space software 404 can generate a work request 460 calling the API 432 to submit a receive data unit of work. The work request 460 can include a work request type and other modifiers. The API 432 can utilize the driver/library 434 to convert the work request 460 (e.g., a verb) to a work queue element 462, and submit the work queue element 462 to the data engine layer 422 of the network adapter 350. The network adapter 350 can process the work queue element 462 through a queue pair context 440 corresponding to the work queue element 462 to identify queue elements in the receive queue 464 or the shared receive queue 474. The network adapter 350 can communicate those queue elements to the API 432. The API 432 can process the queue elements to identify corresponding entries in the memory translation and protection table 442, and use those entries to identify the memory regions where the inbound session data 544 is stored and identify the memory key. Using the memory key, the API 432 can access the inbound session data 544 from the memory regions and communicate the inbound session data 544 to the PaaS/SaaS user space software 404.

In an alternative mode of retrieving data, the PaaS and/or SaaS user space software 404 can generate a work request 470 calling the API 432 to submit a receive data units of work across multiple network connections. The API 432 can utilize the driver/library 434 to convert the work request 470 (e.g., a verb) to a work queue element 472, and submit the work queue element 472 to the shared receive queue 474 in the data engine layer 422 of the network adapter 350. The network adapter 350 can process the work queue element 472 through the queue pair context 440 corresponding to the work queue element 472, for example as previously described for the work queue element 462, but for inbound session data 544 received from a plurality of network nodes.

In response to processing a work queue element 452, 462, 472, the network adapter 350 can input into a completion queue a completion queue element 492 indicating the work for the work queue element 452, 462, 472 is complete. For example, responsive to completing the work queue element 452 from the send queue 454, the network adapter 350 can enter into the completion queue 490 a completion queue element 492 indicating such. Responsive to completing the work queue element 462 from the receive queue 464, the network adapter 350 can enter into the completion queue 490 a completion queue element 492 indicating such. Similarly, responsive completing the work queue element 472 from the shared receive queue 474, the network adapter 350 can enter into the completion queue 490 a completion queue element 492 indicating such. The API 432 can poll the completion queue 490 for completion queue elements 492 and utilize the driver/library 434 to convert the completion queue elements 492 to work complete (WC) indicators 494 that indicate to the PaaS and/or SaaS user space software 404 that the corresponding work requests 450, 460, 470 are complete.

At this point it should be noted that since the encryption/decryption is performed by the network adapter encryption engine 512, the volume of operations performed by the processor 305 is reduced in comparison to the processor 305 performing the encryption/decryption (e.g., using the host hypervisor stack and/or IaaS VM operating system space 408). This improves the processor's operating efficiency and improves performance of the data processing system 300.

From time to time the PaaS and/or SaaS user space software 404 (e.g., the program/utility 355) can determine that the private session key is to be changed. To do so, the PaaS and/or SaaS user space software 404 can return to step 526 and generate a new public key, and the operations described at steps 526-542 again can be performed. The PaaS and/or SaaS user space software 404 can determine to change the private session key at periodic intervals (e.g., every hour, every six hours, every day, etc.) or in response to detecting an event, for example the communication session continuing after a period of inactivity in the communication session exceeding a threshold value.

Responsive to determining that the private session key is to be changed, or responsive to the communication session being terminated, the PaaS and/or SaaS user space software 404 (e.g., program/utility 355) can generate a work request 480 to initiate the network adapter 350 to delete or otherwise destroy the current private session key being used for the communication session. The API 432 can utilize the driver/library 434 to convert that work request 480 to a work queue element 482, and submit the work queue element 482 to a session key control queue 484 in the data engine layer 422 of the network adapter 350. Responsive to the work queue element 482 being added to the session key control queue 484, the network adapter 350 can delete, or otherwise destroy, the current private session key.

Again, the network adapter 350 can input into the completion queue 490 a completion queue element 492 indicating the work for the work queue element 482 is complete. The API 432 can poll the completion queue 490 for the completion queue element 492 and utilize the driver/library 434 to convert the completion queue element 492 to a work complete (WC) indicator 494 that indicates to the PaaS and/or SaaS user space software 404 that the corresponding work request 480 is complete.

FIG. 6 depicts a flow diagram 600 illustrating another example of performing RDMA based communication session encryption initialization 86. In this example, a switch 610 can be used to perform the encryption/description of the session packets 544. The switch 610 can be a component of a communication network 504 to which the data processing system 300 is communicatively linked via the network adapter 350. For example, the switch 610 can be a component of a local area network (LAN) or a wide area network (WAN) to which the data processing system 300 is communicatively linked. In this example, the network adapter 350 need not include the encryption engine 512 and software stack 510, though the present example is not limited in this regard.

In illustration, the switch 610 can be a Software-Defined Networking (SDN) switch or smart switch that supports SDN, and can include a switch software stack 612. For example, the switch 610 can offload processing tasks the processor 305 of the data processing system 300 normally would handle, such as performing encryption/decryption, performing firewall operations, and implementing communication processing. The communication processing can include TCP/IP communication processing, HTTP communication processing, DTLS communication processing and/or QUIC communication processing.

The switch 610 can include a switch encryption engine 614 configured to encrypt and decrypt data packets, as will be described. The switch 610 also can include communication ports (not shown) configured to communicate via one or more communication networks. By way of example, the switch 610 can include one or more Ethernet ports and/or one or more a wireless communication (e.g., WiFi) ports.

In operation, the data processing system 300 can execute a program/utility 355 (FIG. 3) hosted in the PaaS and/or SaaS user space software 404, and that initiates RDMA connection establishment 520 for a communication session. For example, the program/utility 355 can listen for connection requests, including a connection request from the client device 502. In response to receiving a connection request from the client device 502, at step 622 the program/utility 355, using the API 432 or another API, can provision, in real time, the switch 610 for RDMA communications with the client device 502. In illustration, the provisioning can include the program/utility 355 creating a queue pair, which includes a send queue 454 and a receive queue 464, in the data engine layer 422 of the switch 610. The provisioning also can include the program/utility 355 creating a completion queue 490 in the data engine layer 422 of the switch 610. The provisioning further can include the program/utility 355 registering a memory region of the data processing system 300 with the switch 610. For example, the program/utility 355 can update the memory translation and protection table 442 in the switch 610 to indicate memory regions of the data processing system 300 from which data is to be accessed or copied, and to which data is communicated.

Thereafter, the data processing system 300 can communicate with the client device 502 via RDMA.

The program/utility 355 can communicate to the client device 502, via RDMA, data indicating that the program/utility 355 is ready to receive a request for an encrypted communication session. In response, the client device 502 can communicate, in real time, to the PaaS and/or SaaS user space software 404 a request 524 for an encrypted session. The request can indicate cypher suites available for encryption by the client device 502, TLS versions used by the client device 502 and a string of random bytes known as "client random" data. In response to the request 524, the program/utility 355 can perform a public key exchange with the client device 502. In illustration, the program/utility 250 can generate, in real time, a public key, select a cypher suite from among the cypher suites indicated by the client device 502, and select a TLS version from among the TLS versions indicated by the client device 502.

At step 526, the program/utility 250 can communicate, in real time, to the client device 502 the public key and indications of the selected cypher suite and TLS version. For example, the PaaS/SaaS User Space Software 404 can communicate to the client device 502 the public key, indications of the selected cypher suite and TLS version, and a "server random," which can be another random string of bytes that's generated by the server. The switch 610 can communicate the public key, indications of the selected cypher suite and TLS version. and the "server random" to the client device 502 in accordance with the process described in FIG. 4 for sending outbound session data.

In response to receiving the public key and indications of the selected cypher suite and TLS version, the client device 502 can verify a server certificate for the data processing system 300 and extract the public key. The client device 502 can use the public key to encrypt, in real time, a new pre-master key 528, and communicate, in real time, the pre-master key 528 to the data processing system 300. For example, the client device 502 and its switch 610 can send the pre-master key 528 in accordance with the process described in FIG. 4 for sending outbound session data. The switch 610 can receive the pre-master key 528 and store the pre-master key to one or more regions of memory of the data processing system 300, and the PaaS/SaaS User Space Software 404 can access the pre-master key 528 from the memory region(s) in accordance with the process described in FIG. 4 for receiving inbound session data. At step 532, the PaaS/SaaS User Space Software 404 can generate a private session key from the client random, the server random, and the premaster secret previously exchanged. At step 634 the PaaS/SaaS User Space Software 404 can communicate the private session key to the switch 610 via a work request 480, which can be submitted as a work queue element 482 on the private session key control queue 484. The switch 610 can setup the private session key for use on encryption and decryption of messages associated with the queue pair context 440. The PaaS/SaaS User Space Software 404 can communicate to the client device 502 a "finished" message encrypted with the session key. Communication then can begin using the private session key. In this regard, in response to completion of the private session key exchange, at step 642 the switch 610 can start, in real time, the communication session with the client device 502, including exchange of session data 544.

Communication of session data 544 between the PaaS/SaaS user space software 404 and the client device 502 can take place in accordance with the processes described with respect to FIG. 4, except with the addition of the switch 610 using the private session key to encrypt and decrypt the session data.

In illustration, for outbound session data 544, the PaaS and/or SaaS user space software 404 can generate work requests 450 indicating session data 544 to be communicated to the client device 502. As noted, the work requests 450 can include a work request type, a scatter/gather list of memory regions (e.g., local memory buffers) in the data processing system 300 containing the session data 544 to be communicated, and other modifiers. The API 432 can utilize the driver/library 434 to convert the work requests 450 (e.g., verbs) to work queue elements 452, and submit the work queue elements 452 to the send queue 454, established for the communication session in the data engine layer 422 of the switch 610, as queue elements of the send queue 454.

The switch 610 can process the work queue elements 452 to access the outbound session data 544 from the indicated memory regions, and generate encrypted outbound session data 546 by encrypting the outbound session data 544 using the private session key to establish a secured communication tunnel (secure RDMA tunnel) over which RDMA communications take place. The switch 610 can communicate the encrypted outbound session data 546, over the secure RDMA tunnel, to another network communication device managing RDMA for the client device 502. The other network communication device can decrypt the encrypted outbound session data 546 to retrieve the session data 544 using its private session key, and store the session data 544 in memory regions (e.g., memory buffers) of the client device 502. The other network communication device can create a queue element in a receive queue of the other network communication device. The other network communication device also can update a memory translation and protection table of the other network communication device to indicate where the session data is stored. The client device 502 can access the session data using the processes described herein for receiving session data.

The switch 610 can receive inbound encrypted session data 546, generated by the client device 502, from the other network communication device used by the client device 502, and generate inbound session data 544 by decrypting the inbound encrypted session data 546. The switch 610 can store the inbound session data 544 to memory regions (e.g., a memory buffer) of the data processing system 300. The switch 610 can update the memory translation and protection table 442 with data (e.g., one or more data table entries) indicating the memory regions where the inbound session data 544 is stored and a memory key to access those memory regions. Further, the switch 610 can generate a queue element in the receive queue 464. That queue element can indicate data (e.g., data table entries) generated for the inbound session data 544.

To retrieve the inbound session data 544, the PaaS and/or SaaS user space software 404 can generate a work request 460 calling the API 432 to submit a receive data unit of work. The work request 460 can include a work request type and other modifiers. The API 432 can utilize the driver/library 434 to convert the work request 460 (e.g., a verb) to a work queue element 462, and submit the work queue element 462 to the data engine layer 422 of the switch 610. The switch 610 can process the work queue element 462 through a queue pair context 440 corresponding to the work queue element 462 to identify queue elements in the receive queue 464 or the shared receive queue 474. The switch 610 can communicate those queue elements to the API 432. The API 432 can process the queue elements to identify corresponding entries in the memory translation and protection table 442, and use those entries to identify the memory regions where the inbound session data 544 is stored and identify the memory key. Using the memory key, the API 432 can access the inbound session data 544 from the memory regions and communicate the inbound session data 544 to the PaaS/SaaS user space software 404.

In an alternative mode of retrieving data, the PaaS and/or SaaS user space software 404 can generate a work request 470 calling the API 432 to submit a receive data units of work across multiple network connections. The API 432 can utilize the driver/library 434 to convert the work request 470 (e.g., a verb) to a work queue element 472, and submit the work queue element 472 to the shared receive queue 474 in the data engine layer 422 of the switch 610. The switch 610 can process the work queue element 472 through the queue pair context 440 corresponding to the work queue element 472, for example as previously described for the work queue element 462, but for inbound session data 544 received from a plurality of network nodes.

In response to processing a work queue element 452, 462, 472, the switch 610 can input into a completion queue a completion queue element 492 indicating the work for the work queue element 452, 462, 472 is complete. For example, responsive to completing the work queue element 452 from the send queue 454, the switch 610 can enter into the completion queue 490 a completion queue element 492 indicating such. Responsive to completing the work queue element 462 from the receive queue 464, the switch 610 can enter into the completion queue 490 a completion queue element 492 indicating such. Similarly, responsive completing the work queue element 472 from the shared receive queue 474, the switch 610 can enter into the completion queue 490 a completion queue element 492 indicating such. The API 432 can poll the completion queue 490 for completion queue elements 492 and utilize the driver/library 434 to convert the completion queue elements 492 work complete (WC) indicators 494 that indicate to the PaaS and/or SaaS user space software 404 that the corresponding work requests 450, 460, 470 are complete.

At this point it should be noted that since the encryption/decryption is performed by the switch encryption engine 614, the volume of operations performed by the processor 305 is reduced in comparison to the processor 305 performing the encryption/decryption (e.g., using the host hypervisor stack and/or IaaS VM operating system space 408). This improves the processor's operating efficiency and improves performance of the data processing system 300.

From time to time the PaaS and/or SaaS user space software 404 (e.g., the program/utility 355) can determine that the private session key is to be changed. To do so, the PaaS and/or SaaS user space software 404 can return to step 526 and generate a new public key, and the operations described at steps 526-542 again can be performed. The PaaS and/or SaaS user space software 404 can determine to change the private session key at periodic intervals (e.g., every hour, every six hours, every day, etc.) or in response to detecting an event, for example the communication session continuing after a period of inactivity in the communication session exceeding a threshold value.

Responsive to determining that the private session key is to be changed, or responsive to the communication session being terminated, the PaaS and/or SaaS user space software 404 (e.g., program/utility 355) can generate a work request 480 to initiate the switch 610 to delete or otherwise destroy the current private session key being used for the communication session. The API 432 can utilize the driver/library 434 to convert that work request 480 (e.g., a verb) to a work queue element 482, and submit the work queue element 482 to a session key control queue 484 in the data engine layer 422 of the switch 610. Responsive to the work queue element 482 being added to the session key control queue 484, the switch 610 can delete, or otherwise destroy, the current private session key.

Again, the switch 610 can input into the completion queue 490 a completion queue element 492 indicating the work for the work queue element 482 is complete. The API 432 can poll the completion queue 490 for the completion queue element 492 and utilize the driver/library 434 to convert the completion queue element 492 to a work complete (WC) indicator 494 that indicates to the PaaS and/or SaaS user space software 404 that the corresponding work request 480 is complete.

FIG. 7 depicts a flowchart illustrating a method 700 of performing RDMA based communication session encryption initialization. In the following description, encryption and decryption operations can be performed by the network communication device 420 (e.g., the network adapter 350 or the switch 610) independent of the processor 305.

At step 702, the network communication device 420 can receive, from a data processing system, a private session key.

At step 704, the network communication device 420 can receive in a send queue of the network communication device, from the data processing system, a first work queue element, the first work queue element indicating outbound session data to be communicated to a client device.

At step 706, the network communication device 420 can, responsive to receiving the first work queue element, generate encrypted outbound session data by encrypting the outbound session data using the private session key.

At step 708, the network communication device 420 can communicate, via remote directory memory access (RDMA) over a secured communication tunnel, the encrypted outbound session data to the client device The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

receiving, by a network communication device from a data processing system, a private session key;

receiving in a send queue of the network communication device, from the data processing system, a first work queue element, the first work queue element indicating outbound session data to be communicated to a client device;

responsive to receiving the first work queue element, generating, by the network communication device, encrypted outbound session data by encrypting the outbound session data using the private session key; and communicating, by the network communication device, via remote directory memory access (RDMA) over a secured communication tunnel, the encrypted outbound session data to the client device.

2. The method of claim 1, further comprising:

receiving, by the network communication device from the client device, via the RDMA over the secured communication tunnel, inbound encrypted session data;

generating, by the network communication device, inbound session data by decrypting the inbound encrypted session data using the private session key;

storing, by the network communication device, the inbound session data to a memory buffer of the data processing system;

indicating, by the network communication device, where the inbound session data is stored in the memory buffer by updating a memory translation and protection table; and generating a queue element of a receive queue or a queue element of a shared receive queue indicating data in the memory translation and protection table generated for the inbound session data.

3. The method of claim 1, further comprising:

communicating, by the network communication device via the RDMA, a public key to the client device; and receiving, by the network communication device via the RDMA, a pre-master key from the client device, wherein the private session key is determined based on the pre-master key.

4. The method of claim 1, further comprising:

performing, by the network communication device, a private session key exchange, the private session key exchange establishing a secure tunnel for RDMA communications between the network communication device and the client device using the private session key.

5. The method of claim 1, further comprising:

receiving, by the network communication device, in a session key control queue of the network communication device, from the data processing system, a second work queue element, the second work queue element indicating the private session key is to be used to encrypt the outbound session data; and responsive to receiving the second work queue element, adding the private session key for use by the network communication device to encrypt the outbound session data.

6. The method of claim 1, further comprising:

receiving, by the network communication device, in a session key control queue of the network communication device, from the data processing system, a second work queue element, the second work queue element indicating the private session key is to be deleted or destroyed; and responsive to receiving the second work queue element, deleting or destroying, by the network communication device, the private session key.

7. The method of claim 6, further comprising:

responsive to the network communication device deleting or destroying the private session key, generating, by the network communication device, a completion queue element in a completion queue, the completion queue element indicating the private session key has been deleted or destroyed.

8. The method of claim 1, wherein the communicating, by the network communication device, via the RDMA over the secured communication tunnel, the encrypted outbound session data to the client device comprises:

communicating the outbound session data to another network communication device used by the client device.

9. A network communication device, comprising:

a processor programmed to initiate executable operations comprising:

receiving, from a data processing system, a private session key;

receiving in a send queue of the network communication device, from the data processing system, a first work queue element, the first work queue element indicating outbound session data to be communicated to a client device;

responsive to receiving the first work queue element, generating encrypted outbound session data by encrypting the outbound session data using the private session key; and communicating, via remote directory memory access (RDMA) over a secured communication tunnel, the encrypted outbound session data to the client device.

10. The network communication device of claim 9, the executable operations further comprising:

receiving, by the network communication device from the client device, via the RDMA over the secured communication tunnel, inbound encrypted session data;

generating, by the network communication device, inbound session data by decrypting the inbound encrypted session data using the private session key;

storing, by the network communication device, the inbound session data to a memory buffer of the data processing system;

indicating, by the network communication device, where the inbound session data is stored in the memory buffer by updating a memory translation and protection table; and generating a queue element of a receive queue or a queue element of a shared receive queue indicating data in the memory translation and protection table generated for the inbound session data.

11. The network communication device of claim 9, the executable operations further comprising:

communicating, by the network communication device via the RDMA, a public key to the client device; and receiving, by the network communication device via the RDMA, a pre-master key from the client device, wherein the private session key is determined based on the pre-master key.

12. The network communication device of claim 9, the executable operations further comprising:

performing, by the network communication device, a private session key exchange, the private session key exchange establishing a secure tunnel for RDMA communications between the network communication device and the client device using the private session key.

13. The network communication device of claim 9, the executable operations further comprising:

receiving, by the network communication device, in a session key control queue of the network communication device, from the data processing system, a second work queue element, the second work queue element indicating the private session key is to be used to encrypt the outbound session data; and responsive to receiving the second work queue element, adding the private session key for use by the network communication device to encrypt the outbound session data.

14. The network communication device of claim 9, the executable operations further comprising:

receiving, by the network communication device, in a session key control queue of the network communication device, from the data processing system, a second work queue element, the second work queue element indicating the private session key is to be deleted or destroyed; and responsive to receiving the second work queue element, deleting or destroying, by the network communication device, the private session key.

15. The network communication device of claim 14, the executable operations further comprising:

responsive to the network communication device deleting or destroying the private session key, generating, by the network communication device, a completion queue element in a completion queue, the completion queue element indicating the private session key has been deleted or destroyed.

16. The network communication device of claim 9, wherein the communicating, by the network communication device, via the RDMA over the secured communication tunnel, the encrypted outbound session data to the client device comprises:

communicating the outbound session data to another network communication device used by the client device.

17. A computer program product, comprising:

one or more computer readable storage mediums having program code stored thereon, the program code stored on the one or more computer readable storage mediums collectively executable by a network communication device to initiate operations including:

receiving, from a data processing system, a private session key;

receiving in a send queue of the network communication device, from the data processing system, a first work queue element, the first work queue element indicating outbound session data to be communicated to a client device;

responsive to receiving the first work queue element, generating encrypted outbound session data by encrypting the outbound session data using the private session key; and communicating, via remote directory memory access (RDMA) over a secured communication tunnel, the encrypted outbound session data to the client device.

18. The computer program product of claim 17, wherein the program code is executable by the network communication device to initiate the operations further comprising:

receiving, by the network communication device from the client device, via the RDMA over the secured communication tunnel, inbound encrypted session data;

generating, by the network communication device, inbound session data by decrypting the inbound encrypted session data using the private session key;

storing, by the network communication device, the inbound session data to a memory buffer of the data processing system;

indicating, by the network communication device, where the inbound session data is stored in the memory buffer by updating a memory translation and protection table; and generating a queue element of a receive queue or a queue element of a shared receive queue indicating data in the memory translation and protection table generated for the inbound session data.

19. The computer program product of claim 17, wherein the program code is executable by the network communication device to initiate the operations further comprising:

communicating, by the network communication device via the RDMA, a public key to the client device; and receiving, by the network communication device via the RDMA, a pre-master key from the client device, wherein the private session key is determined based on the pre-master key.

20. The computer program product of claim 17, wherein the program code is executable by the network communication device to initiate the operations further comprising:

performing, by the network communication device, a private session key exchange, the private session key exchange establishing a secure tunnel for RDMA communications between the network communication device and the client device using the private session key.

* * * * *